(12) United States Patent
Weres

(10) Patent No.: US 9,498,749 B2
(45) Date of Patent: Nov. 22, 2016

(54) METHOD TO NEUTRALIZE HYDROGEN CHLORIDE IN SUPERHEATED GEOTHERMAL STEAM WITHOUT DESTROYING SUPERHEAT

(75) Inventor: Oleh Weres, Gardnerville, NV (US)

(73) Assignee: CHEMTREAT, INC., Glen Allen, VA (US)

( * ) Notice: Subject to any disclaimer, the term of this patent is extended or adjusted under 35 U.S.C. 154(b) by 653 days.

(21) Appl. No.: 12/765,706

(22) Filed: Apr. 22, 2010

(65) Prior Publication Data

US 2010/0278703 A1 Nov. 4, 2010

Related U.S. Application Data

(60) Provisional application No. 61/173,731, filed on Apr. 29, 2009.

(51) Int. Cl.
*B01D 53/68* (2006.01)

(52) U.S. Cl.
CPC ......... *B01D 53/68* (2013.01); *B01D 2251/306* (2013.01); *B01D 2251/606* (2013.01); *B01D 2257/2042* (2013.01); *B01D 2257/2045* (2013.01); *B01D 2257/302* (2013.01); *B01D 2257/40* (2013.01); *B01D 2257/708* (2013.01)

(58) Field of Classification Search
CPC .................. B01D 2251/306; B01D 2251/606; B01D 2257/708; B01D 2257/2045; B01D 2257/302; B01D 2257/40; B01D 2257/2042; B01D 53/68
USPC ............. 423/240 R, 243.08, 245.2, 235, 210
See application file for complete search history.

(56) References Cited

U.S. PATENT DOCUMENTS

| | | | |
|---|---|---|---|
| 4,118,186 A * | 10/1978 | Feess et al. | 8/543 |
| 4,187,087 A | 2/1980 | Whitescarver | |
| 2010/0199559 A1 * | 8/2010 | Hallett et al. | 48/127.7 |

OTHER PUBLICATIONS

Hirtz et al, "Current Techniques in Acid-Chloride Corrosion Control and Monitoring at the Geysers", Proceeding, Sixteenth workshop on Geothermal Reservoir Engineering, Stanford University, Stanford, California, Jan. 23-25, 1991, SGP-TR-134, pp. 83-95.*

(Continued)

*Primary Examiner* — Ngoc-Yen Nguyen
(74) *Attorney, Agent, or Firm* — Oliff PLC; Oleh Weres

(57) ABSTRACT

Hydrogen chloride in superheated steam is neutralized by contacting the steam with a solution containing potassium carbonate. A solution of potassium carbonate will remain liquid when contacted by steam superheated by as much as 40° C. and, unlike sodium carbonate, the degree of superheat of a saturated solution of potassium carbonate increases with temperature. Other highly soluble potassium salts or salt inhibitors can be added to prevent precipitation of solid potassium chloride which may occur under certain conditions, or a small amount of additional water can be added to keep the potassium chloride in solution while allowing the steam to remain superheated. Injection of potassium carbonate solution downhole in a dry steam geothermal well to protect the well casing from corrosion is especially beneficial, because only a small amount of carrier water needs to be injected together with the potassium carbonate, whereby the steam remains superheated and the possibility of localized corrosion is avoided.

20 Claims, 4 Drawing Sheets

(56) References Cited

OTHER PUBLICATIONS

Moore et al ("Solubility of Potassium Carbonate in Water between 384 and 529 K Measured Using the Synthetic Method", J. Chem. Eng. Data, 1997, 42, 1078-1081).*

Fisher, Daniel W., et al, "Alternatives to Traditional Water Washing Used to Remove Impurities in Superheated Geothermal Steam," Geothermal Resources Council Transactions., vol. 20, Sep./Oct. 1996, pp. 737-741.

Hirtz, et al., "Dry Steam Scrubbing for Impurity Removal from Superheated Geothermal Steam.," Geothermal Resources Council Transactions, vol. 26, Sep. 22-25, 2002, pp. 751-754.

"Public Interest Energy Research," California Energy Commission, 2003 Annual Report, Appendix 7, Energy Innovations Small Grant, Mar. 2004, p. 21.

2005 Annual Project Updates for the Public Interest Energy Research Program (PIER)—Draft, California Energy Commission, Mar. 2006, p. 724.

Einarsson, et al., "Acid Wells in the Krafla Geothermal Field," Proceedings World Geothermal Congress 2010, Bali, Indonesia, Apr. 25-29, 2010, pp. 1-6.

"Wellfield and Power Plant Optimization Through Measurement, Material Selection and Process Control," Geothermal Operations and Plant Optimization Conference, Sep. 15, 2011, 6 pages.

Hauksson, et al., "Pilot testing of handling the fluids from the IDDP-1 exploratory geothermal well, Krafla, N.E. Iceland," Geothermics 49 (2014) pp. 76-82.

* cited by examiner

METHOD TO NEUTRALIZE HYDROGEN CHLORIDE IN SUPERHEATED GEOTHERMAL STEAM WITHOUT DESTROYING SUPERHEAT

RELATED PATENT APPLICATIONS

Priority of Provisional Patent Application 61/173,731 filed Apr. 29, 2009 is claimed.

FIELD OF THE INVENTION

A method to neutralize acidic gases and vapors in superheated steam is provided. The method is particularly applicable to superheated steam from geothermal sources which contains hydrogen chloride.

BACKGROUND OF THE INVENTION

References Cited

P. Hirtz, C. Buck and R. Kunzman, "Current techniques in acid-chloride corrosion control and monitoring at The Geysers." In *Proceedings, Sixteenth Workshop on Geothermal Reservoir Engineering*, Stanford University, Stanford, Calif., Jan. 23-25, 1991. Report SGP-TR-134, pp. 83-95.

I. P.-S. Kamps, E. Meyer, B. Rumpf and G. Maurer, "Solubility of CO2 in Aqueous solutions of KCl and in Aqueous Solutions of K2CO3," *J. Chem. Eng. Data*, 2007, 52 (3), 817-832, FIG. 6, quoting G. G. Aseyev, *Electrolytes Equilibria in Solutions and Phase Equilibria, Calculation of Multi component Systems and Experimental Data on the Activities of Water, Vapor Pressures, and Osmotic Coefficients*; Begell House, Inc.: New York, 1998, pp. 254-283.

R. C. Moore, R. E. Mesmer and J. M. Simonson, "Solubility of Potassium Carbonate in Water between 384 and 529 K Measured Using the Synthetic Method," *J Chem. Eng. Data*, 1997, 42 (6), 1078-1081, Table 1.

W. F. Waldeck, G. Lynn and A. E. Little, "Aqueous Solubility of Salts at High Temperatures. 1. Solubility of Sodium Carbonate from 50 to 348°," *J. Am. Chem. Soc.*, 1932, 54 (3), 928-936. Tables I and II.

O. Weres and L. Tsao, "Activity of Water Mixed with Molten Salts at 317° C." J. Phys. Chem., 1986, 90, 3014-3018.

The Problem Addressed

Geothermal steam—that is, steam that flows directly from drilled wells or steam that is separated from hot water that flows from drilled wells—contains a variety of impurities. Carbon dioxide and hydrogen sulfide usually are present, and ammonia, hydrogen chloride (HCl) and/or boric acid may also be present. The concentration of hydrogen chloride sometimes is high enough to corrode well casings, well heads, steam pipelines and other steam gathering equipment or to damage turbines powered by the steam. This problem is most particularly encountered in relation to dry steam produced directly from the ground; for example, in the large geothermal field in Sonoma County and Lake County, California. It may also be encountered where steam is separated from geothermal brine produced at exceptionally high temperature; for example, the hypersaline geothermal brines in Imperial County, California.

For example, Hirtz et al., in Diagram 5 on page 88, indicate that steam in the Sonoma/Lake County area typically contains:

10,000 ppmw $CO_2$
500 ppmw $H_2S$
250 ppmw $NH_3$
10 ppmw HCl
50-100 ppmw B as boric acid The boiling point of pure water (also called saturation temperature $T_{sat}$) is a unique function of pressure $T_{sat}(P)$. When temperature $T=T_{sat}(P)$ at a given pressure P, pure water vapor or steam can coexist at equilibrium with pure water. Likewise, steam and water can coexist at a given temperature T when $P=P_{sat}(T)$. (The saturation pressure $P_{sat}(T)$ is the same mathematical relation as $P_{sat}(T)$ with the variables T and P reversed.) If, however, $T>T_{sat}(P)$ the steam must be dry, and a small amount of liquid water will evaporate if brought into contact with the steam. In this condition steam is said to be superheated, and the degree of superheat is defined as $$\Delta T_{sup} = T - T_{sat}(P)$$

Likewise, steam is superheated when $P<P_{sat}(T)$. Thus, steam which starts out saturated when first separated from liquid water (that is, $T=T_{sat}(P)$ and $P=P_{sat}(T)$) can become superheated either of two ways:

(a) By addition of heat to the steam thereby increasing the temperature at constant P, or
(b) By decrease of the pressure at constant T.

If there is a dry zone around the wellbore where the steam enters the well, both processes will contribute to creating superheat; that is, additional heat will be added to the steam as it flows through the dry rock near to the wellbore, increasing temperature, and the pressure will decrease as it flows. In this case, the produced steam may become superheated by many degrees.

If there is liquid water present near to the wellbore, the steam entering the wellbore will be saturated or nearly so. However, the inevitable pressure drop as the steam flows up the well and through the surface pipes typically will produce a few degrees of superheat.

The functions $T_{sat}(P)$ and $P_{sat}(T)$ describe the equilibrium of pure water with pure water vapor or steam. If dissolved salts are present in the water, the vapor pressure of the solution will be less than $P_{sat}(T)$ because the ions effectively dilute the water in the solution, and the intense electric fields of the ions tend to tie down water molecules and keep them in the liquid phase. In other words, a salt solution will be at equilibrium with water vapor at some value of $P<P_{sat}(T)$, and, therefore, a salt solution can coexist with superheated steam. A salt solution that coexists with superheated steam is also said to be superheated.

The degree of superheat of steam at equilibrium with a salt solution will increase with the concentration of salt in the solution. If a small amount of salt solution is brought into contact with superheated steam, water will evaporate from the solution until the concentration of salt in the solution is sufficient to match the superheat of the steam. (Or the solution may absorb water from the steam until the superheat is equal, if the solution is initially more concentrated.) However, if the superheat is increased beyond a certain point, the concentration of the salt solution will exceed the solubility of the salt, and the solution will completely dry out with solid salt remaining. If the solution contains more than one salt and at least one of the salts is sufficiently soluble, the less soluble salts will precipitate as water evaporates until the remaining solution is at equilibrium with the superheated steam.

The maximum superheat that a solution of a given salt can support is determined by the solubility of the salt or, in the case of ammonium chloride, by the volatility of the salt. The more soluble the salt, the greater the degree superheat of the steam in equilibrium with a saturated solution of that salt. Some very highly soluble salts can form highly concentrated solutions in contact with strongly superheated steam, wherein the weight fraction of water is less than 50%. A salt is said to be capable of supporting a certain number of degrees of superheat if contact of a solution of that salt with a large volume of steam characterized by that degree of superheat will not cause the solution to dry out.

By "desuperheating steam" or "destroying superheat" I mean contacting superheated steam with an amount of water or aqueous solution large enough to ensure that some liquid remains after thermal equilibrium is attained. Hirtz et al. suggest moisture content of at least 0.5 weight % as a practical definition of desuperheated steam and I rely on this definition in the claims.

Contact of superheated geothermal steam with a metallic surface sometimes produces a highly concentrated liquid phase which corrodes the metal. For example, if HCl and ammonia are both present in the steam, they will react to form ammonium chloride and, because ammonium chloride is very highly water soluble and deliquescent, a concentrated solution of ammonium chloride is produced:

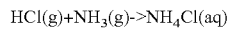

Sufficient HCl and ammonia are present in the Sonoma/Lake County steam field to produce a solution of ammonium chloride that can be superheated by 4 to 10° C. before the ammonium chloride evaporates together with the water and the solution dries out. This solution is acidic and aggressively corrodes well casings, steam pipes and surface equipment.

When steel is attacked by hydrogen chloride in the absence of oxygen, the initial reaction product is another highly soluble salt, ferrous chloride:

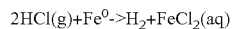

The degree of superheat a solution of ferrous chloride as a function of weight fraction water is illustrated in FIG. 1. At about 171° C.—a typical temperature for geothermal steam—a concentrated solution of ferrous chloride can exist in contact with steam superheated by as much as 24° C. If the degree of superheat is such that can be supported by ferrous chloride, a solution of ferrous chloride will form, and some of the HCl present in the steam will dissolve in this solution, making it highly corrosive. This means that once corrosion starts, a highly corrosive liquid phase will form which causes corrosion to accelerate; that is, positive feedback.

Thus, geothermal steam that contains HCl is potentially corrosive if superheated by less than 24° C. If geothermal steam contains both HCl and ammonia, it will be corrosive if superheated by less than about 10° C. Extensive practical experience in the Sonoma/Lake County geothermal steam field confirms these predictions.

PRIOR ART

Hydrogen chloride in steam superheated by less than about 24° C. must be removed or neutralized to prevent corrosion.

Prior art comprises neutralizing HCl in geothermal steam by injecting a solution of sodium hydroxide (NaOH; commonly called "caustic" in the geothermal industry) into a well head or steam pipe. The NaOH reacts with the HCl in the steam to produce sodium chloride, which is much less corrosive. This prior art method has a variety of drawbacks and limitations which are described at length in the paper by Hirtz et al. which is hereby incorporated by reference.

Geothermal steam usually contains a substantial amount of carbon dioxide. When sodium hydroxide solution is contacted with steam to neutralize HCl, it also reacts with carbon dioxide to produce sodium carbonate:

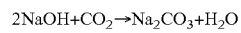

Sodium carbonate is less soluble than sodium hydroxide and the vapor pressure of a saturated sodium carbonate solution is nearly that of pure water. Table 1 shows the solubility of sodium carbonate, and the degree of superheat of steam in contact with a saturated solution of sodium carbonate at various temperatures (data quoted and interpolated from Waldeck et al.)

TABLE 1

Concentration and Superheat of Saturated Solutions of Sodium Carbonate

| Temperature (° C.) | Solubility (w %) | Superheat (° C.) |
|---|---|---|
| 112.0 | 30.8 | 5.1 |
| 121.0 | 29.8 | 4.4 |
| 160.0 | 26.8 | 3.6 |
| 176.5 | 25.5 | 3.3 |
| 231.0 | 19.8 | 3.0 |
| 313.0 | 6.2 | 2.1 |

Thus, adding NaOH to steam that is superheated by more than a few degrees can cause rapid accumulation of solid sodium carbonate mixed with sodium chloride, and crevice corrosion can occur underneath the solid deposits. In particular, NaOH may react with hydrogen sulfide in the steam forming sodium bisulfide NaSH which would then accumulate as a highly concentrated and corrosive solution underneath the solids at the surface of the metal.

In order to avoid precipitation of sodium carbonate, treatment with caustic requires adding enough water with the caustic to essentially eliminate superheat, and to produce a significant amount of liquid at equilibrium with the steam. Boric acid in the steam dissolves in the liquid in sufficient concentration to make the liquid corrosive, wherefore additional NaOH must be added to neutralize the boric acid, substantially increasing the amount of caustic consumed. The solubility of sodium borate produced by reaction with boric acid is limited, and more water must be added to keep it in solution. Typically, an amount of water equivalent to 3 or 4 weight % of the steam must be added to desuperheat the steam and provide a sufficient volume of liquid to keep the sodium chloride and sodium borate in solution. Hirtz et al. teach that sodium borate has been known to deposit in separators and plug water drain lines when residual water fractions drop below 0.5% and recommend maintaining residual water fraction in treated steam in the 1-2% range. The resulting liquid phase must be removed from the steam before it enters the turbine. With superheat gone, the turbine operates with decreased thermodynamic efficiency, and significantly less power is generated.

Furthermore, concentrated solutions of NaOH are themselves corrosive to many materials, extremely hazardous to personnel, and freeze well above the freezing point of pure water, commonly requiring storage in heated tanks.

The substantial amount of water that must be added to the steam together with NaOH effectively precludes application of NaOH downhole at some depth down in the well bore to protect the casing from corrosion. Sufficient water must be added to desuperheat the steam with some liquid remaining. If this water is added to the steam inside the casing, portions of the inside surface of the casing will be wetted, with temperature nearly as low as the saturation temperature of pure water at the ambient pressure. Because the steel casing is an excellent conductor of heat, adjacent areas of the casing will also be cooled to the point that a highly corrosive solution of ammonium chloride condenses. In this way, injection of NaOH solution can actually induce severe localized corrosion. Fear of such corrosion has precluded sustained downhole application of NaOH in dry steam wells.

Hirtz describes this problem and suggest how corrosion may be controlled. The following two paragraphs are quoted from Hirtz at page 85, column 2, first paragraph, and page 86, column 2, last paragraph concluding on page 87.

Most flue gas streams require wet scrubbers for desulfurization, making it impossible to maintain temperatures above the acid-dewpoint. The prime area of corrosion within wet scrubbers is in the hot gas quench zone. At the wet/dry interface, rapid cooling occurs that can induce condensation immediately upstream of the alkaline scrubbing liquor. Solid deposits form downstream of the interface in the wet zone which can also promote localized attack. As the wet/dry interface line shifts with changing load conditions, deposits can trap concentrated acids and shield them from the high-pH scrubbing solution. Under these conditions, the most effective means to combat corrosion is to line the exposed walls with sheets of high alloy material, such as Hastelloy C-276.

Volatile chloride corrosion at The Geysers is also similar to conventional flue gas dewpoint corrosion with respect to problems within the quench zone of scrubbing equipment. Superheated steam is rapidly brought to saturation near the water/caustic injection point as part of the corrosion mitigation process. Pipe wall temperature gradients can reach 100° F. over very short intervals, inducing acid-dewpoint conditions adjacent to the alkaline wet zone. The alkaline wet region may not completely coat the pipe until several feet downstream of injection, and its coverage will vary depending upon superheat, steam velocity, water injection rate and piping/nozzle geometry. Scale deposits can trap acid-chloride beneath as the wet/dry interface shifts with changing production conditions. Corrosion in this zone is highly localized and can only be effectively eliminated through the use of high-alloy or lined mixing spools.

Thus, the problem of corrosion of well casing by superheated steam containing HCl remains unsolved, while control of corrosion in steam pipes and surface equipment by application of NaOH has a variety of drawbacks.

SUMMARY OF THE INVENTION

Hydrogen chloride in superheated steam is neutralized by contacting the steam with a solution of an alkaline potassium compound. Most preferably, a solution of potassium carbonate is employed, because a solution of potassium carbonate will remain liquid when contacted by steam superheated by as much as 40° C. and, unlike sodium carbonate, the degree of superheat of a saturated solution of potassium carbonate increases with temperature. Potassium hydroxide, potassium bicarbonate or potassium sesquicarbonate can also be used, as a chemically equivalent amount of anyone of these compounds would produce the same result as potassium carbonate when contacted with superheated steam. However, potassium carbonate is preferred, because it is much safer to handle than potassium hydroxide, and less needs to be used than would be the case with potassium bicarbonate or potassium sesquicarbonate.

Injection of potassium carbonate solution downhole in a dry steam geothermal well through capillary tubing to protect the casing from corrosion is especially beneficial, because only the small amount of water needed to serve as carrier water needs to be injected together with the potassium carbonate, whereby the steam remains superheated and the possibility of localized corrosion is avoided.

Other highly soluble potassium salts or salt inhibitors can be added to prevent precipitation of solid potassium chloride which can occur under certain conditions, or a small amount of additional water can be added to keep the potassium chloride in solution, while retaining the steam in a superheated condition.

The invention claimed excludes a situation where some small amount of an alkaline potassium compound may be present in a solution of caustic or sodium carbonate which is used to neutralize acid vapors; for example, wherein the number of moles of potassium in the caustic is not more than one-tenth the number of moles of sodium.

LIST OF DRAWING FIGURES

Figure 3:
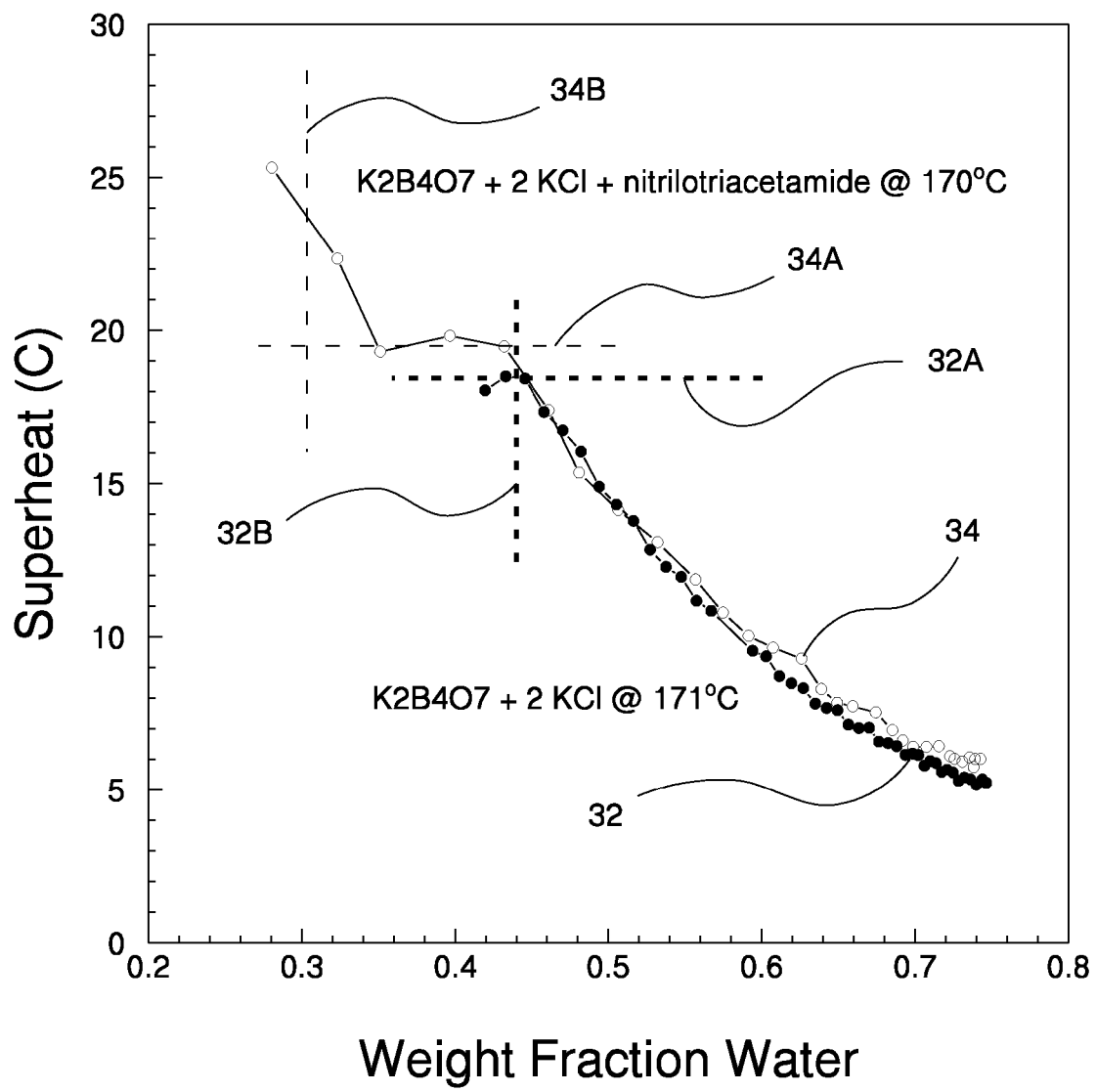

FIG. 3 illustrates the degree of superheat of a solution of containing equivalent amounts of potassium chloride and potassium tetraborate as a function of weight fraction water at 171° C., and illustrates how adding a small amount of the salt inhibitor nitrilotriacetamide to the solution extends the range of superheat that can be tolerated before solids precipitate and the resulting slurry ceases to be fluid.

Figure 4:
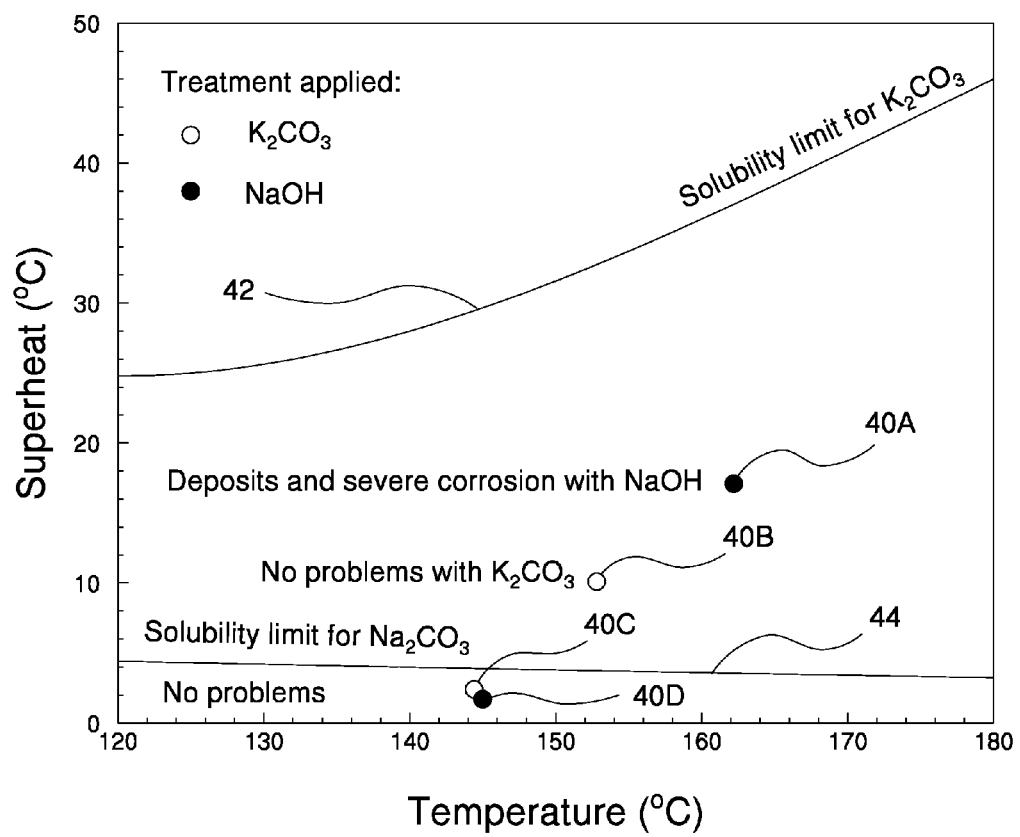

FIG. 4 summarizes the results of a test where treatment of geothermal wells producing dry steam using potassium carbonate was compared to treatment using sodium hydroxide.

DESCRIPTION OF DRAWING FIGURES

Figure 1:
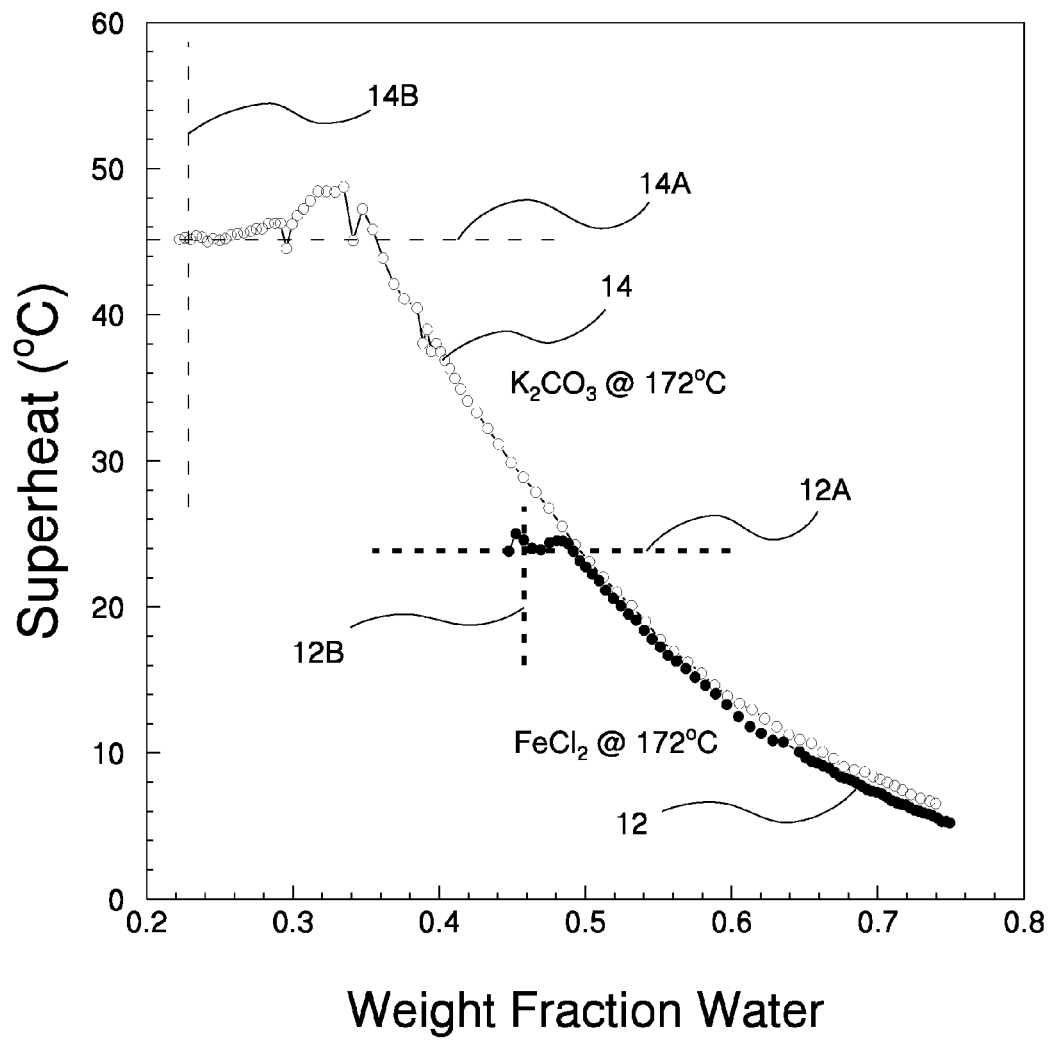
FIG. 1 illustrates the degree of superheat of solutions of ferrous chloride and potassium carbonate as a function of weight fraction water at 172° C.

FIG. 1 illustrates the degree of superheat of solutions of ferrous chloride 12 and potassium carbonate 14 as a function of weight fraction water at 172° C. These data were generated using equipment and method similar to those described in the paper by Weres and Tsao, which is hereby incorporated by reference. One skilled in the art will be able to determine the degree of superheat of any salt solution as a function of water content using this method.

Line 12A indicates the degree of superheat at which the solution of ferrous chloride dried out. Line 12B indicates the limit of reliable data. As weight fraction water inside the pressure vessel decreased below the value corresponding to line 12B (that is, data points to the left of line 12B), readings of the two temperature probes inside the pressure vessel diverged, indicating that the probes were incrusted with solids. Thus, line 12B represents the minimum weight fraction water at which a slurry of ferrous chloride crystals dispersed in a saturated solution of ferrous chloride remains fluid. Lines 14A and 14B have corresponding significance in relation to the potassium carbonate data 14.

Figure 2:
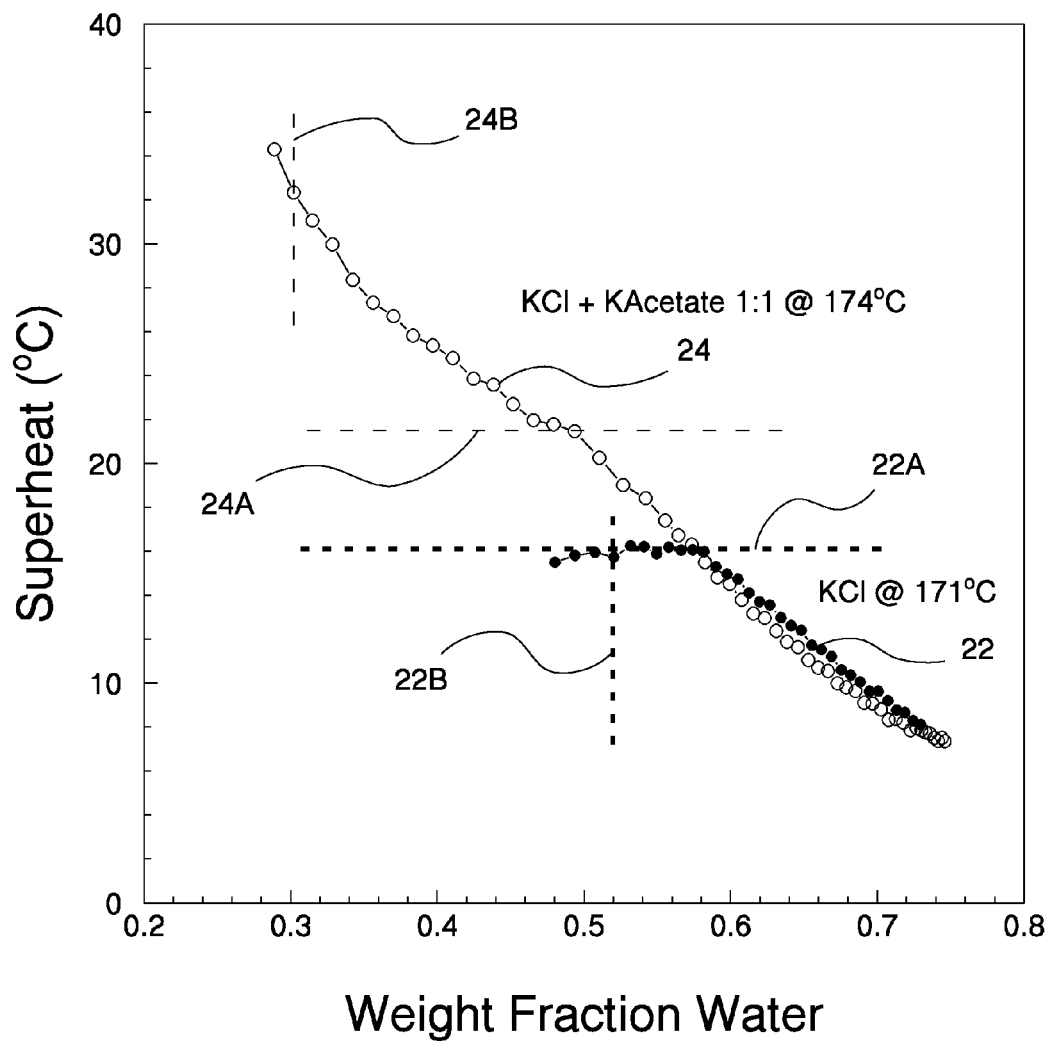
FIG. 2 illustrates the degree of superheat of a solution of potassium chloride as a function of weight fraction water at 171° C., and illustrates how adding an equivalent amount of potassium acetate to the solution extends the range of superheat that can be tolerated before solids precipitate and the resulting slurry ceases to be fluid.

FIG. 2 illustrates the degree of superheat of a solution of potassium chloride 22 as a function of weight fraction water at 171° C., and illustrates how adding an equivalent amount of potassium acetate to the solution extends the range of superheat 24 that can be tolerated before solids precipitate and the resulting slurry ceases to be fluid. Lines 22A and 22B are analogous to lines 12A and 12B in FIG. 1. Line 24A indicates the degree of superheat at which solid KCl begins to precipitate from the solution containing equivalent amounts of KCl and potassium acetate, producing a slurry of salt crystals in a saturated solution. As more water is removed from the mixture, the degree of superheat increases until the slurry ceases to be fluid at 24B, as indicated by divergence of temperature readings caused by incrustations on the temperature probes.

FIG. 3 illustrates the degree of superheat 32 of a solution containing equivalent amounts of potassium chloride and potassium tetraborate as a function of weight fraction water at 171° C., and illustrates how adding nitrilotriacetamide to the solution extends the range of superheat 34 that can be tolerated before solids precipitate and the resulting slurry ceases to be fluid. The source of nitrilotriacetamide was a product called NaMinus® 55 obtained from Weatherford International. The amount of NaMinus® 55 employed was 0.65 g per equivalent of total potassium in the solution (which in a practical application would be equal to the number of equivalents of potassium carbonate applied), providing roughly 0.2 g of nitrilotriacetamide per equivalent of potassium in the solution. Potassium tetraborate and KCl appear to form two distinct liquid phases, and the solubility of either salt in the other liquid is small. Limited mutual solubility is indicated by the fact that the maximum superheat 32A attained in the absence of the nitrilotriacetamide was only slightly greater than with KCl alone (22A in FIG. 2). Adding nitrilotriacetamide inhibited precipitation of KCl to some degree, allowing a somewhat higher value of superheat 34A to be attained (about 19° C.) before KCl started to precipitate. The plateau at superheat 34A corresponds to a region where the KCl rich liquid dries out, producing solid KCl while slightly increasing the amount of the potassium tetraborate rich liquid. After the KCl rich liquid is gone, superheat again increases as the remaining potassium tetraborate solution becomes more concentrated, until the slurry ceases to be fluid at about 34B.

FIG. 4 summarizes the results of a test where treatment of geothermal wells producing dry steam using potassium carbonate was compared to treatment using sodium hydroxide. Wells 40A and 40D were treated using NaOH, while wells 40B and 40C were treated using potassium carbonate. In each case a concentrated solution of the indicated chemical was injected immediately downstream of the main control valve into the pipeline connecting the main control valve to the isolation valve on the steam collection header connecting several wells. Sodium hydroxide and potassium carbonate were equally effective in controlling corrosion with no problems resulting when applied to wells 40C and 40D which were producing weakly superheated steam not expected to dry out a solution of sodium carbonate. Treating more strongly superheated well 40B with potassium carbonate was equally effective with no problems noted. However, treating the most strongly superheated well 40A with NaOH produced massive deposits of NaCl and sodium carbonate mixed with corrosion products in the isolation valve downstream of the injection point, and the metal underneath the deposits was severely corroded.

DESCRIPTION OF THE INVENTION

Saturated solutions of potassium carbonate can coexist with steam much more strongly superheated than is the case with sodium carbonate (compare Table 2 to Table 1), and, unlike sodium carbonate, the maximum degree of superheat increases with increasing temperature. The solubility values in Table 2 interpolated from Moore et al., Table 1. The superheat values were calculated using vapor pressure values determined by extrapolation using vapor pressure values quoted by Kamps, et. al., FIG. 6.

The degree of superheat of a solution of potassium carbonate at 171° C. as a function of weight fraction water is illustrated in FIG. 1 and compared to the superheat of a solution of ferrous chloride. The potassium carbonate solution attained a much higher degree of superheat than the ferrous chloride solution before solid salt began to precipitate. Thus, potassium carbonate will remain soluble and be effective throughout the entire range of superheat at which a corrosive solution comprising ferrous chloride might otherwise form.

TABLE 2

Concentration and Superheat of Saturated Potassium Carbonate Solutions

| Temperature (° C.) | Solubility (w %) | Superheat (° C.) |
|---|---|---|
| 125. | 64.2 | 25. |
| 140. | 66.7 | 28. |
| 160. | 69.2 | 36. |
| 180. | 70.8 | 46. |
| 200. | 71.4 | 50. |

Potassium carbonate is most conveniently transported, stored and applied as a solution containing about 40 to 47 weight % of $K_2CO_3$. The lowest freezing point of the solution is about −24° C. at 40 weight %, and 47% solution is commonly available in commerce. One skilled in the art will know how much carrier water to add just prior to injection to ensure smooth flow down a capillary tube and avoid the possibility of plugging due to dry-out. To keep the volumes injected manageable, a solution containing at least 0.1% by weight of potassium carbonate should be applied, and preferably at least 1% by weight.

TABLE 3

Summary of Superheat Data

| Salt | First solid appears at $\Delta T_{sup,Max}$ | Condition when $\Delta T_{sup} > \Delta T_{sup,Max}$ |
|---|---|---|
| $Na_2CO_3$ | ~3.5 | Dry salt. |
| NaCl | ~13 | Dry salt. |
| KCl | 16 | Dry salt. |
| $K_2B_4O_7$ + 2KCl | 16.4 | Incrustations form in the absence of a salt inhibitor; fluid slurry persists to significantly higher superheat in the presence of a salt inhibitor. |

TABLE 3-continued

Summary of Superheat Data

| Salt | First solid appears at $\Delta T_{sup,Max}$ | Condition when $\Delta T_{sup} > \Delta T_{sup,Max}$ |
|---|---|---|
| 2KCl + 1K Acetate | 18 | Fluid slurry. |
| 1KCl + 1K Acetate | 22 | Fluid slurry. |
| KCl + ½ $K_2B_4O_7$ + K Acetate | 23.5 | Fluid 3-phase emulsion. |
| $FeCl_2$ | 24 | Dry salt. |
| $K_2B_4O_7$ | 34 | Glass. |
| $K_2CO_3$ | 45 | Dry salt. |
| K Acetate | >63 | Dry salt. |

Preferably, the amount of potassium carbonate injected should be that needed to effectively stop corrosion or slightly more. If HCl is the corrosive agent of primary concern, the mole ratio of potassium carbonate to HCl should be at least 0.5 to 1, which is the proportion required to fully neutralize the HCl. One skilled in the art will know how to install an on-line corrosion meter and/or corrosion coupons to monitor corrosion rates, and to adjust the amount of potassium carbonate injected to provide adequate control with some margin of safety.

The degree of superheat at which a solid starts to precipitate from a salt solution near to 171° C. is shown for several salts and salt mixtures in Table 3, together with a description of the physical state of the mixture at superheat slightly above that at which solid starts to precipitate.

Steam at 171° C. containing HCl may be corrosive at superheat up to 24° C. because a corrosive solution of ferrous chloride may exist up to that degree of superheat (FIG. 1). Thus, ideally, the potassium carbonate should be injected downhole at a depth where the superheat equals or slightly exceeds 24° C. Steam that is sufficiently superheated to dry out a solution of ferrous chloride (that is, by more than about 24° C., the exact value depending on temperature) need not be treated, because no corrosive liquid phase can form if ferrous chloride dries out.

Reaction of HCl in the steam with potassium carbonate produces potassium chloride:

$$K_2CO_3 + 2HCl \rightarrow 2KCl + CO_2 + H_2O$$

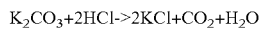

Potassium chloride cannot support as much superheat as potassium carbonate or ferrous chloride; for example, at 171° C., a solution of KCl will dry out if superheat exceeds 16° C. (FIG. 2). This means that contacting steam superheated by more than 16° C. with potassium carbonate solution risks precipitating solid KCl in the well bore. While steam superheated by up to 16° C. can be treated using potassium carbonate alone and steam superheated by more than 24° C. need not be treated, treating steam with superheat in the range of 16 to 24° C. may require additional measures to prevent solid deposits of KCl from forming.

This problem can be avoided in several ways which can be implemented individually or in combination:

1. If the superheat at the point of injection is large enough to dry out a solution of KCl, additional water can be added to decrease the degree of superheat of the steam enough to keep the KCl in solution. For example, adding about 1.26% water to steam at 180° C. and 5.0 bar—which is initially superheated by about 28° C.—will decrease the temperature of the steam and the degree of superheat to 165° C. and 13° C., respectively. One skilled in the art of geothermal reservoir engineering will know how to calculate the degree of superheat as a function of depth in the well based on P-T survey data, and will know how to calculate the amount of water that must be added in order to decrease superheat by a predetermined amount as needed to decrease superheat to 16° C. or slightly less.

2. Inject together with potassium carbonate a second potassium salt which is able to support at least as much superheat as KCl alone, and will therefore combine with KCl to form a more concentrated solution which will remain fully liquid at superheat in the range 16-24° C., or which will at least produce a fluid slurry instead of drying out or depositing solid incrustations upon metal surfaces. The second salt can be formulated in a single solution together with potassium carbonate, or can be injected as a separate solution. Potassium acetate or another potassium salt of a carboxylic acid would serve this purpose, as would potassium nitrate, potassium methanesulfonate or another potassium salt of a sulfonic acid. The number of equivalents of the second salt added for this purpose should be at least one-tenth of the number of equivalents of potassium carbonate to produce a useful effect.

3. Apply a salt inhibitor or crystal modifying agent together with potassium carbonate to inhibit the precipitation of KCl and/or modify the crystal structure of the precipitate in a way that keeps the resulting slurry fluid above 16° of superheat and keeps solids from adhering to metal surfaces. A variety of compounds known to inhibit precipitation of NaCl will also inhibit KCl; for example, potassium ferricyanide, nitrilotriacetamide and salts thereof, and carboxymethylinulin. The amount of salt inhibitor added should be at least 0.01 weight percent in relation to the potassium carbonate in order to produce a useful effect.

Commonly, some amount of boric acid is present in superheated geothermal steam. If the amount of potassium carbonate applied exceeds the amount needed to neutralize the HCl, the excess will react with boric acid to form potassium borate, with K/B ratio similar to potassium tetraborate:

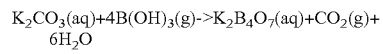

A solution of potassium tetraborate will support more superheat than KCl (up to 34° C. at 171° C.) but concentrated solutions of potassium borate and KCl form separate liquid phases at this temperature with limited mutual solubility (FIG. 3). Thus, the maximum superheat of a solution of KCl increases only slightly when potassium tetraborate is added to it. However, addition of nirilotriacetamide, which is a potent salt inhibitor, delays precipitation of KCl, and causes the KCl to precipitate in a manner which produces a more liquid slurry in combination with potassium tetraborate. This effect is illustrated in FIG. 3.

Hirtz discusses the corrosive effect of boric acid in the steam. The following paragraph is quoted from Hirtz at page 87, column 2, first paragraph.

Boric acid is another natural component of Geysers steam that is a significant pH buffer in the corrosion mitigation process, although unlike $CO_2$, boric acid does not benefit the process chemistry. The presence of boric acid requires excess caustic injection to maintain the scrub-water pH above 7.8 units due to the boric acid pka of about 9.0 at the process temperature. This effect is most obvious in lower chloride wells (<10 $ppm_w$) where boron to chloride ratios can be very high, requiring over 8 moles of NaOH per mole HCl to maintain the pH above 8.0 units.

Concentrated solutions of KCl and potassium acetate are completely miscible, and application of potassium acetate in combination with potassium carbonate produces a solution that remains completely liquid to a higher degree of superheat, which increases with the mole fraction of potassium acetate. However, under realistic process conditions wherein a very small volume of highly concentrated salt solution coexists with a much larger amount of superheated steam, reaction with boric acid will tend to convert potassium acetate to acetic acid vapor:

$$2CH_3CO_2K+4B(OH)_3(g) \to K_2B_4O_7(aq)+ 2CH_3CO_2H(g)+5H_2O$$

This reaction can only be prevented by applying sufficient potassium carbonate to convert most of the boric acid in the steam to potassium tetraborate in addition to the potassium carbonate needed to convert the HCl in the steam to KCl. Thus, the boric acid in the steam increases the amount of potassium carbonate consumed. This problem could be avoided by using the potassium salt of a less volatile carboxylic acid when the amount of boric acid present in the steam is significant in relation to the HCl; for example, potassium glycolate. In this case, only enough potassium carbonate would be needed to fully neutralize HCl and provide a modest margin of safety.

This problem can also be avoided by using potassium methane sulfonate or another potassium salt of a sulfonic acid in place of potassium acetate. Because methanesulfonic acid is a much stronger acid than acetic acid, potassium methanesulfonate would not be decomposed by reaction with boric acid.

Optionally, a volatile amine can be applied together with potassium carbonate. The volatile amine will provide a second line of defense in case some HCl gets past the potassium carbonate and threatens corrosion or turbine damage further downstream. One skilled in the art will know a variety of volatile amines which have been used for corrosion control; for example but not limited to: 2-amino-2-methyl-I-propanol (AMP), ethanolamine (ETA, also called monoethanoleamine or MEA), N,N-diethyl-2-ethanol amine, morpho line and cyclohexylamine. Preferably, the amine employed should be one characterized by a combination of strong alkalinity and relatively low volatility; for example, AMP. This combination of properties will increase the tendency of the amine to dissolve in the small amount of concentrated salt solution that will be present together with the superheated steam.

A corrosion inhibitor can also be applied in combination with potassium carbonate; for example, a filming amine. Because filming amines are water soluble only under acidic conditions, a filming amine would need to be applied as a solution separate from the solution of potassium carbonate.

Example 1

Application of potassium carbonate was tested and compared with application of sodium hydroxide in four geothermal wells producing superheated steam that contains sufficient HCl to cause corrosion problems. Two of these wells produce weakly superheated steam that would not cause a solution of sodium carbonate to dry out. The other two wells produce steam which is sufficiently superheated to dry out sodium carbonate, but not nearly superheated enough to dry out potassium carbonate.

The temperature, pressure and degree of superheat of the steam produced by these wells and the treatments applied are summarized in Table 4 and illustrated in FIG. 4. The details of this test and the results obtained are summarized in the description of FIG. 4 above which shows the location of these wells on a plot of superheat vs. temperature.

TABLE 4

| Geothermal Wells Treated | | | | | |
|---|---|---|---|---|---|
| Well | P(bar) | T(° C.) | $\Delta T_{sup}$(° C.) | Treatment | Result |
| 40A | 4.17 | 162.2 | 17.1 | NaOH | Corrosion and accumulation of solids |
| 40B | 3.90 | 152.8 | 10.1 | $K_2CO_3$ | No problem. |
| 40C | 3.82 | 144.4 | 2.4 | $K_2CO_3$ | No problem. |
| 40D | 3.97 | 145.0 | 1.7 | NaOH | No problem. |

If the steam is saturated or weakly superheated, the sodium carbonate will stay in solution and, therefore, sodium hydroxide will have a protective effect similar to that of potassium carbonate. Thus, Well 40D was protected by sodium hydroxide as well as Well 40C was protected by potassium carbonate with no problems reported by the field personnel in either case.

However, the sodium carbonate produced by injecting sodium hydroxide into the strongly superheated well Well 40A dried out and failed to prevent corrosion; indeed, injection of sodium hydroxide appeared to aggravate corrosion. Massive deposits of a white solid with dark streaks accumulated in and about the control valve, and the stainless steel ball of the control valve was severely corroded. Analysis showed the solid to be a mixture of sodium chloride and sodium carbonate with a minor amount of iron also present. Also, thick deposits of an intensely black, friable material accumulated in the steam header and steam lines. This black material gradually dissolved in acid with evolution of hydrogen sulfide; iron sulfide is believed to be a major constituent, as might be expected if a highly concentrated solution of sodium bisulfide was indeed present at the surface of the metal.

In summary, treatment of Well 40A with sodium hydroxide was a failure which caused at least as many problems as it was intended to solve. On the hand, superheated well Well 40B, which was treated with potassium carbonate, did not appear to have any problems with deposits or corrosion. Thus, treatment with potassium carbonate was successful in application to superheated Well 40B.

Example 2

Instead of NaOH, Well D was treated with potassium carbonate injected downhole through a stainless steel capillary tube together with a small amount of carrier water at a depth of about 2,000 feet=600 meters below the surface. At this depth, the steam was superheated by about 7° C., precluding application of NaOH. The corrosion rate at the wellhead as determined using an electrical resistance probe was consistently less than 2 mils=50 micrometers per year and no pitting or solid deposits were observed.

CONCLUSIONS AND RAMIFICATIONS

My invention provides a solution to a serious practical problem previously unsolved: how to treat superheated geothermal steam downhole to neutralize HCl in the steam and thereby protect the well casing from corrosion. The method is also applicable to treating superheated steam in steam pipes, well heads and other equipment at the surface.

In addition to its superior performance as a corrosion inhibitor, potassium carbonate is much safer and therefore easier to handle than sodium hydroxide because it is much less alkaline and much less corrosive. Potassium carbonate will not cause the damage to the chemical injection apparatus that has been observed with sodium hydroxide in some cases, and field personnel will have much less objection to handling it. Brief contact of skin with a concentrated solution of potassium carbonate will not cause the immediate, severe injury that an equally concentrated solution of sodium hydroxide or potassium hydroxide would cause.

When chemicals are added to treat geothermal steam one or more injection ports or capillary tubes may be used. In particular, multiple injection ports or capillary tubes are used when two or more products are applied. In other cases, flow rates are limited by the small diameter of the capillary tube or by pump capacity, requiring two or more capillary tubes or injection ports to be used. One skilled in the art will recognize that the method provided can be implemented using a solution of potassium carbonate added to geothermal steam using one or more injection ports or capillary tubes, and that water or another chemical solution can be applied together with potassium carbonate using the same or another injection port or capillary tube. What is important is the aggregate amount of potassium carbonate in all of the solutions contacted with the steam, the aggregate amount of water, and the aggregate amount of any other chemical that may be used.

In case KCl or another solid does accumulate inside a well casing, well head, steam line, valve or another metallic construct through which the steam flows, the solid can periodically be removed by washing with water.

My invention can be used to treat geothermal steam that comes directly out of a well, or to treat steam from another kind of geothermal source; for example, steam separated from geothermal brine.

My invention can be used to treat steam that goes to a turbine or to a heat exchanger or steam which is temporarily discharged to the atmosphere.

While I have described my invention in application to geothermal steam, steam containing corrosive gases or vapors can similarly be treated in other applications; for example, petroleum refining, chemical manufacturing, coal gasification and others.

While I have described my invention in application to neutralizing HCl in steam, it may be used to neutralize other acidic gases and vapors; for example, HBr, sulfuric acid, nitric acid, sulfur trioxide, sulfur dioxide, acetic acid or other volatile organic acids.

Although the description above contains many specificities, these should not be construed as limiting the scope of the invention but merely as providing examples of some of the presently preferred embodiments. Thus the scope of the invention should be determined by the appended claims and their legal equivalents, rather than by the examples given.

While I believe the explanations given to be true, I do not wish to be bound by my theories and interpretations.

The invention claimed is:

1. A method of neutralizing at least part of the acidic impurities present in a superheated steam by contacting the superheated steam with one or more aqueous liquids, wherein:
   at least one of said aqueous liquids comprises an alkaline compound of potassium,
   the superheated steam comes from a geothermal source and contains the acidic impurity hydrogen chloride,
   the superheated steam is characterized by a temperature and a degree of superheat that is greater than a degree of superheat of steam at equilibrium with a saturated solution of sodium carbonate at said temperature,
   a volume and composition of said aqueous liquids are predetermined such that:
      the superheated steam remains superheated after said contacting step, all of the hydrogen chloride is neutralized, and
      said contacting step does not produce solid deposits of potassium chloride, and
   if the superheated steam is characterized by a temperature and a degree of superheat that would otherwise produce solid deposits of potassium chloride, then at least one of the following conditions is met:
      at least one of said aqueous liquids further comprises a potassium salt capable of supporting at least as much superheat as potassium chloride,
      at least one of said aqueous liquids further comprises a salt inhibitor, and
      the aggregate amount of water in said aqueous liquids is selected to decrease the degree of superheat of the superheated steam by an amount sufficient to prevent solid deposits of potassium chloride from forming.

2. The method of claim 1, wherein said alkaline compound of potassium is selected from the class consisting of potassium carbonate, potassium bicarbonate, potassium sesquicarbonate and potassium hydroxide.

3. The method of claim 2, wherein said alkaline compound of potassium is potassium carbonate.

4. The method of claim 3, wherein said contacting step takes place downhole in a dry steam geothermal well.

5. The method of claim 1, wherein at least one of said aqueous liquids further comprises a potassium salt capable of supporting at least as much superheat as potassium chloride.

6. The method of claim 5, wherein said potassium salt is a potassium salt of a carboxylic acid.

7. The method of claim 6, wherein said potassium salt of a carboxylic acid is potassium acetate.

8. The method of claim 5, wherein said potassium salt is a potassium salt of a sulfonic acid.

9. The method of claim 8, wherein said potassium salt of a sulfonic acid is potassium methanesulfonate.

10. The method of claim 5, wherein said potassium salt is potassium nitrate.

11. The method of claim 1, wherein at least one of said aqueous liquids further comprises a salt inhibitor.

12. The method of claim 11, wherein said salt inhibitor is selected from the class consisting of nitrilotriacetamide and its salts, ferricyanide salts, and carboxymethylinulin.

13. The method of claim 1, wherein at least one of said aqueous liquids further comprises a volatile amine.

14. The method of claim 1, wherein the aggregate amount of water in said aqueous liquids is selected to decrease the degree of superheat of the superheated steam by an amount sufficient to prevent solid deposits of potassium chloride from forming.

15. The method of claim 5 wherein the aggregate number of equivalents of said potassium salt in said aqueous liquids is at least one-tenth the aggregate number of equivalents of potassium carbonate in said aqueous liquids.

16. The method of claim 11, wherein an amount of the salt inhibitor in said aqueous liquids equals at least 0.01% by weight with respect to the aggregate amount of potassium carbonate in said aqueous liquids.

17. The method of claim 2, wherein said alkaline compound of potassium is potassium hydroxide.

18. A method of neutralizing hydrogen chloride present in a superheated steam, the method comprising:
  contacting the superheated steam containing the hydrogen chloride with an aqueous liquid comprising water and potassium carbonate, wherein the superheated steam has a degree of superheat of at least about 16° C., and wherein:
    a volume of the aqueous liquid and concentration of potassium carbonate are provided so that:
      (i) the potassium carbonate neutralizes the hydrogen chloride,
      (ii) the superheated steam remains superheated after contact with the aqueous liquid, and
      (iii) the contacting does not produce solid deposits of potassium chloride, and
    at least one of the following conditions is met:
      the aqueous liquid further comprises a potassium salt capable of supporting at least as much superheat as potassium chloride,
      the aqueous liquid further comprises a salt inhibitor, and
      the amount of water in said aqueous liquid is selected to decrease the degree of superheat of the superheated steam by an amount sufficient to prevent solid deposits of potassium chloride from forming.

19. The method of claim 18, wherein the aqueous liquid comprises at least one of a salt inhibitor and a potassium salt capable of supporting at least as much superheat as potassium chloride.

20. The method of claim 1, wherein:
  the superheated steam further contains the acidic impurity boric acid, and
  the volume and composition of the aqueous liquids are predetermined such that at least part of the boric acid is neutralized.

* * * * *